(12) United States Patent
Steele

(10) Patent No.: US 12,474,048 B2
(45) Date of Patent: Nov. 18, 2025

(54) FINGERPRINTING SYSTEM AND METHOD

(71) Applicant: Purdue Research Foundation, West Lafayette, IN (US)

(72) Inventor: Charles A. Steele, Hobart, IN (US)

(73) Assignee: Purdue Research Foundation, West Lafayette, IN (US)

( * ) Notice: Subject to any disclaimer, the term of this patent is extended or adjusted under 35 U.S.C. 154(b) by 76 days.

(21) Appl. No.: 18/122,225

(22) Filed: Mar. 16, 2023

(65) Prior Publication Data
US 2023/0296246 A1    Sep. 21, 2023

Related U.S. Application Data

(60) Provisional application No. 63/320,336, filed on Mar. 16, 2022.

(51) Int. Cl.
| | |
|---|---|
| A61B 5/1172 | (2016.01) |
| B05B 7/20 | (2006.01) |
| C10L 1/06 | (2006.01) |
| C10L 3/00 | (2006.01) |
| C10L 3/06 | (2006.01) |
| C10L 11/00 | (2006.01) |
| F23D 99/00 | (2010.01) |
| B05B 9/01 | (2006.01) |

(52) U.S. Cl.
CPC ............. *F23D 99/002* (2025.08); *B05B 7/20* (2013.01); *C10L 1/06* (2013.01); *C10L 3/00* (2013.01); *C10L 3/06* (2013.01); *C10L 11/00* (2013.01); *A61B 5/1172* (2013.01); *B05B 9/01* (2013.01); *C10L 2200/0469* (2013.01); *C10L 2270/08* (2013.01); *F23D 2900/21007* (2013.01)

(58) Field of Classification Search
None
See application file for complete search history.

(56) References Cited

U.S. PATENT DOCUMENTS

| | | | | |
|---|---|---|---|---|
| 3,161,985 A | * | 12/1964 | Fiske .................... | A01M 13/00 111/125 |
| 4,869,936 A | * | 9/1989 | Moskowitz ............. | C23C 4/129 239/81 |
| 5,395,445 A | * | 3/1995 | Bohanan .............. | A61B 5/1172 118/31.5 |

(Continued)

OTHER PUBLICATIONS

Almog, J., et al., Reagents for the Chemical Development of Latent Fingermarks: Scope and Limitations of Benzo(f) ninhydrin in Comparison to Ninhydrin. J Forensic Sci, (2000), vol. 45, No. 3, pp. 538-544.

(Continued)

*Primary Examiner* — Binu Thomas
(74) *Attorney, Agent, or Firm* — Purdue Research Foundation

(57) ABSTRACT

The fingerprinting system includes a main body, an air movement source, an ignitor, and a hydrocarbon fuel source. The main body includes a handle. The air movement source includes a fan. The air movement source is coupled to the main body. The fingerprinting system is configured to burn the hydrocarbon fuel source to produce soot containing carbon. The air movement source is configured to direct the soot containing carbon toward a surface to be analyzed for fingerprints.

18 Claims, 6 Drawing Sheets

(56) References Cited

U.S. PATENT DOCUMENTS

| | | | | |
|---|---|---|---|---|
| 7,487,739 | B1* | 2/2009 | Weaver | A61B 5/117 |
| | | | | 118/31.5 |
| 8,430,054 | B1* | 4/2013 | Hunter | A61B 5/1172 |
| | | | | 118/31.5 |
| 9,095,863 | B1* | 8/2015 | Galbraith | C23C 4/12 |
| 2010/0040764 | A1* | 2/2010 | Schwartz | A61B 5/1172 |
| | | | | 118/31.5 |
| 2015/0247639 | A1* | 9/2015 | Lovascio | F23N 5/022 |
| | | | | 431/12 |
| 2015/0258555 | A1* | 9/2015 | Peterson | B05B 13/005 |
| | | | | 239/223 |
| 2016/0286927 | A1* | 10/2016 | Winkler | F23D 14/28 |
| 2022/0330750 | A1* | 10/2022 | Yekutiely | F24B 15/005 |

OTHER PUBLICATIONS

Wargacki, S. P. et al., L.A. Enhancing the Quality of Aged Latent Fingermarks Developed by Superglue Fuming: Loss and Replenishment of Initiator. (University of Tennessee Research Report NIJ). Knoxville: University of Tennessee, Chemistry Department (2007). J Forensic Sci, Sep. 2008, vol. 53, No. 5; available online at: www.blackwell-synergy.com.

Wargacki, S. P. et al., Understanding the Chemistry of the Development of Latent Fingermarks by Superglue Fuming. (University of Tennessee Research Report NIJ). Knoxville: University of Tennessee, Chemistry Department. 2007. J Forensic Sci, Sep. 2007, vol. 52, No. 5; available online at www.blackwell-synergy.com.

Fallano, J. F. Alternatives to "Alternative Light Sources": How to Achieve a Greater Print Yield with Cyanoacrylate Fuming. Journal of Forensic Identification, (1992), vol. 42, No. 2, pp. 91-95.

Grady, D. P. Cyanoacrylate Fuming: Accelerating by Heat within a Vacuum. Journal of Forensic Identification, (1999), vol. 49, No. 4, pp. 377-387.

Menzel, E. R. et al., Photoluminescent Semiconductor Nanocrystals for Fingermark Detection. J Forensic Sci, (2000), vol. 45, No. 3, pp. 545-551.

Perkins, D. G. et al., Cyanoacrylate Fuming Prior to Submission of Evidence to the Laboratory. Journal of Forensic Identification (1991), vol. 41, No. 3, pp. 157-162.

Strobl, G. The Physics of Polymers: Concepts for Understanding Their Structure and Behavior. 3rd ed. Springer Berlin Heidelberg New York, (2007).

Trozzi, T. A. et al., Processing Guide for Developing Latent Prints, U.S. Department of Justice, Federal Bureau of Investigation, Laboratory Division, 70 pgs. (2000).

Watkin, J. E. et al., Cyanoacrylate Fuming of Latent Prints: Vacuum Versus Heat/Humidity. Journal of Forensic Identification, vol. 44, No. 5, pp. 545-556, (1994).

Weaver, D. E. et al., Specific Heat Capacity Thermal Function of the Cyanoacrylate Fingerprint Development Process. Document No. 227934, NIJ 2007-DN-BX-K242; 94 pgs, (Aug. 2009).

Weaver, D. E. et al., Large Scale Cyanoacrylate Fuming. Journal of Forensic Identification, Technical Report, Latent Fingerprint Section, vol. 43, No. 2, pp. 135-137, (1993).

Zorich, S. R., Laterally Reversed Cyanoacrylate Developed Prints on Tape. Journal of Forensic Identification, vol. 42, No. 5, pp. 396-400, (1992).

Bond, J.W., Visualization of Latent Fingerprint Corrosion of Metallic Surfaces. Journal of Forensic Sciences, (Jul. 2008), vol. 53, No. 4, pp. 812-822.

* cited by examiner

Table vi: Average Color Data

| Method | L(avg) | ΔL | a(avg) | Δa | b(avg) | Δb | ΔE |
|---|---|---|---|---|---|---|---|
| Axis Inversion Red Dyeing | 82.81±5.4 | -4.70 | 9.22 ± 2.2 | 8.67 | 0.04±0.01 | -0.92 | 9.66 |
| 2 ethyl-2-cyanoacrylate Fuming | 86.35±0.3 | -0.63 | 0.84±0.1 | 0.29 | 0.90±0.1 | -0.06 | 0.70 |
| Carbon Black Dusting | 60.69±9.6 | -26.29 | 0.44±0.1 | -0.11 | 1.42±0.5 | 0.46 | 26.29 |

FIG. 7

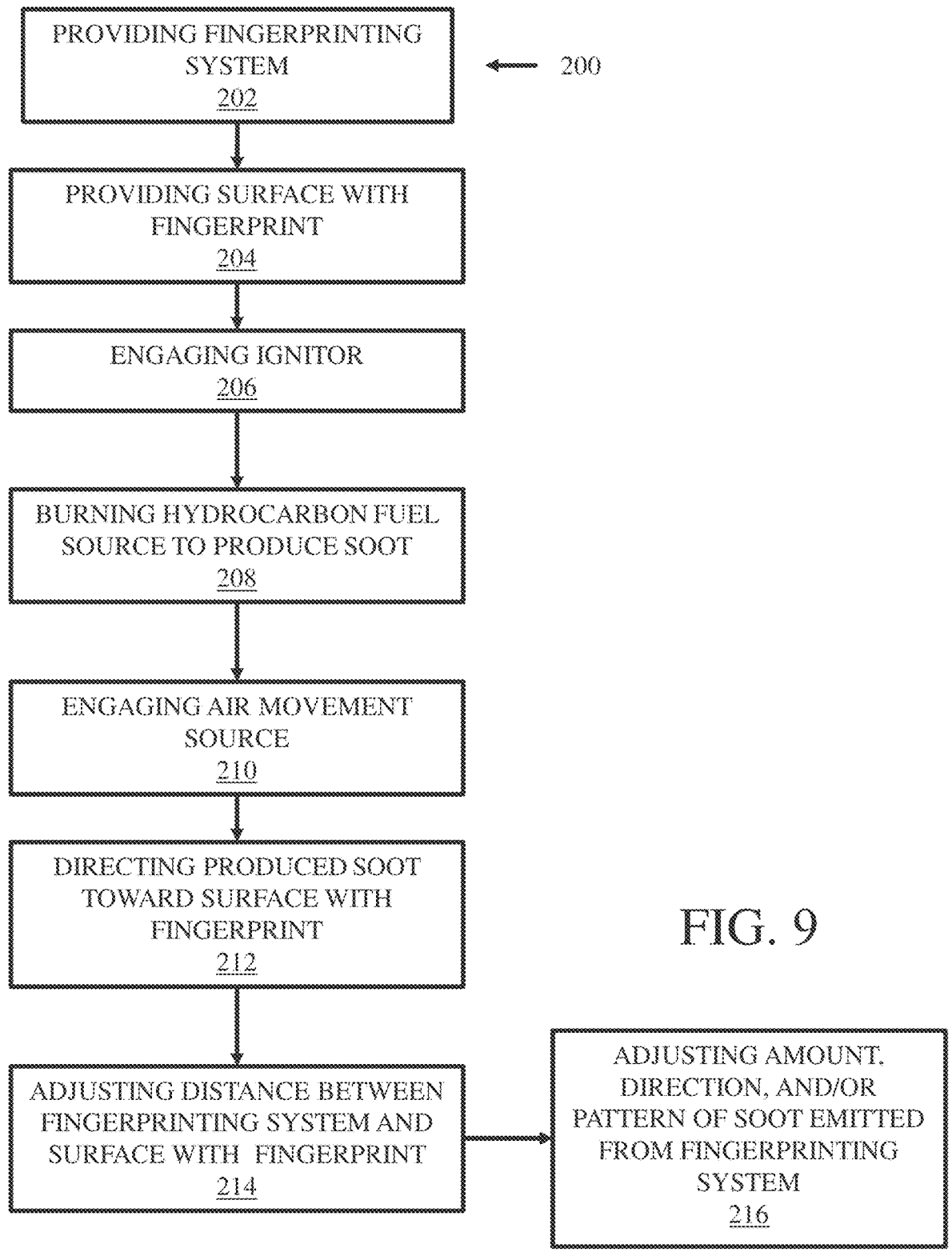

FINGERPRINTING SYSTEM AND METHOD

CROSS REFERENCE TO RELATED APPLICATIONS

The present application is a U.S. non-provisional application which claims the benefit of U.S. provisional application Ser. No. 63/320,336, filed Mar. 16, 2022, the content of which is incorporated by reference herein in its entirety.

FIELD

The disclosure generally relates to forensic tools and, more particularly, to fingerprint developing systems.

INTRODUCTION

This section provides background information related to the present disclosure which is not necessarily prior art.

Fingerprints are the lines formed by the uneven skin on the fingertips of humans and other mammalian species. Fingerprints may also refer to the marks left on touched objects by the secreted moisture and oils on fingertips. These fingerprint marks can be used as evidence in criminal science and forensic science. Since many fingerprints found on crime scenes are usually invisible to the naked eye, research has focused on applying various techniques to make fingerprints visible for analysis.

The fingerprint display method commonly used in criminal investigation is to use a hydrocarbon powder to cover the moisture and/or oil secreted from a fingertip onto the surface being analyzed. The hydrocarbon powder is commonly provided as a dust that may be brushed onto a surface. This process is labor intensive to push every area of a surface and is quite messy. The background color of the surface being analyzed can be contrasted with the color difference of the hydrocarbon powder, revealing a visible fingerprint. Then, the visible fingerprint can be re-transferred on an adhesive film. This method includes many hazards and inefficiencies. The fingerprint dusting method is hazardous due to its contents and size. For instance, the contents of the small particle carbon dust may explode during transport. The small size of the dust carbon particles may also create a lung irritant hazard for the user. The brush may cross-contaminate the stored dust in the container with every brush stroke on various surfaces. The dust within the container may also agglomerate, causing large clumps that may be unusable and/or interfere with the fingerprinting analysis.

Accordingly, there is a continuing need for a fingerprinting system that may be more quickly applied to larger areas without increasing the risk of cross contaminating the stored hydrocarbon source. Desirably, the fingerprinting system may also better preserve the condition of the fingerprint being analyzed by having a contactless application method.

SUMMARY

In concordance with the instant disclosure, a fingerprinting system that quickly applies a hydrocarbon source to larger areas without increasing the risk of cross contaminating the stored hydrocarbon source, has surprisingly been discovered. Desirably, the fingerprinting system may also better preserve the condition of the fingerprinting by having a contactless application method.

The fingerprinting system includes a main body, an air movement source, an ignitor, and a hydrocarbon fuel source. The main body may include a handle. The air movement source may include a fan. The air movement source may be configured to produce an airflow of less than around ten liters per minute. The air movement source may be coupled to the main body. The hydrocarbon fuel source may include a carbon to hydrogen ratio of $C_nH_{2n}$ to $C_nH_{2n+2}$. It should be appreciated that a greater carbon to hydrogen content ratio may provide an enhanced source of soot to be used for fingerprinting. In a specific example, the hydrocarbon fuel source may include polyaromatic hydrocarbons, strait chains, and/or branched hydrocarbons. The hydrocarbon fuel source may include liquid fuels such as butane and/or motor oil, provided as non-limiting examples. The hydrocarbon fuel source may also include solid fuels such as paraffin and/or wood, provided as non-limiting examples. The hydrocarbon fuel source may include gaseous fuels such as methane, ethane, and/or butane, provided as non-limiting examples. The hydrocarbon fuel source may be coupled to the main body. The ignitor may be configured to burn the hydrocarbon fuel source and/or initiate the combustion of the hydrocarbon fuel source. The fingerprinting system may be configured to produce soot from the burning of the hydrocarbon fuel source, and to direct the soot, via the air movement source, toward a surface to be analyzed for fingerprints.

In certain circumstances, the fingerprinting system may include a kit. The kit may include a main body, an air movement source, an ignitor, and a hydrocarbon fuel source. Each of the air movement source, the ignitor, and the hydrocarbon fuel source may be configured to be individually coupled to the main body. In certain circumstances, the hydrocarbon fuel source may be configured to be selectively coupled to the main body. Advantageously, where the hydrocarbon fuel source is configured to be selectively coupled to the main body, the hydrocarbon fuel source may be refilled and/or replaced, thereby permitting the fingerprinting system to be utilized for multiple applications.

Various ways of using the fingerprinting system are provided. For instance, a method may include a step of providing the fingerprinting system. The method may include a step of providing a surface to be analyzed for fingerprints. Next, the ignitor of the fingerprinting system may be engaged. The method may include a step of burning the hydrocarbon fuel source to produce particles of soot containing carbon. Then, the air movement source may be engaged. Afterwards, the fingerprinting system may be directed towards the surface to be analyzed for fingerprints. In certain circumstances, a distance between the fingerprinting system and the surface to be analyzed for fingerprints may be adjusted so that larger particles of soot are militated against from being disposed on the surface to be analyzed for fingerprints.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

FIG. 7 is a table of the fingerprinting system in comparison to axis inversion red dyeing and carbon black dusting, according to one embodiment of the present disclosure;

FIG. 9 is a flowchart depicting a method for using the fingerprinting system, according to one embodiment of the present disclosure.

DETAILED DESCRIPTION

Figure 1:
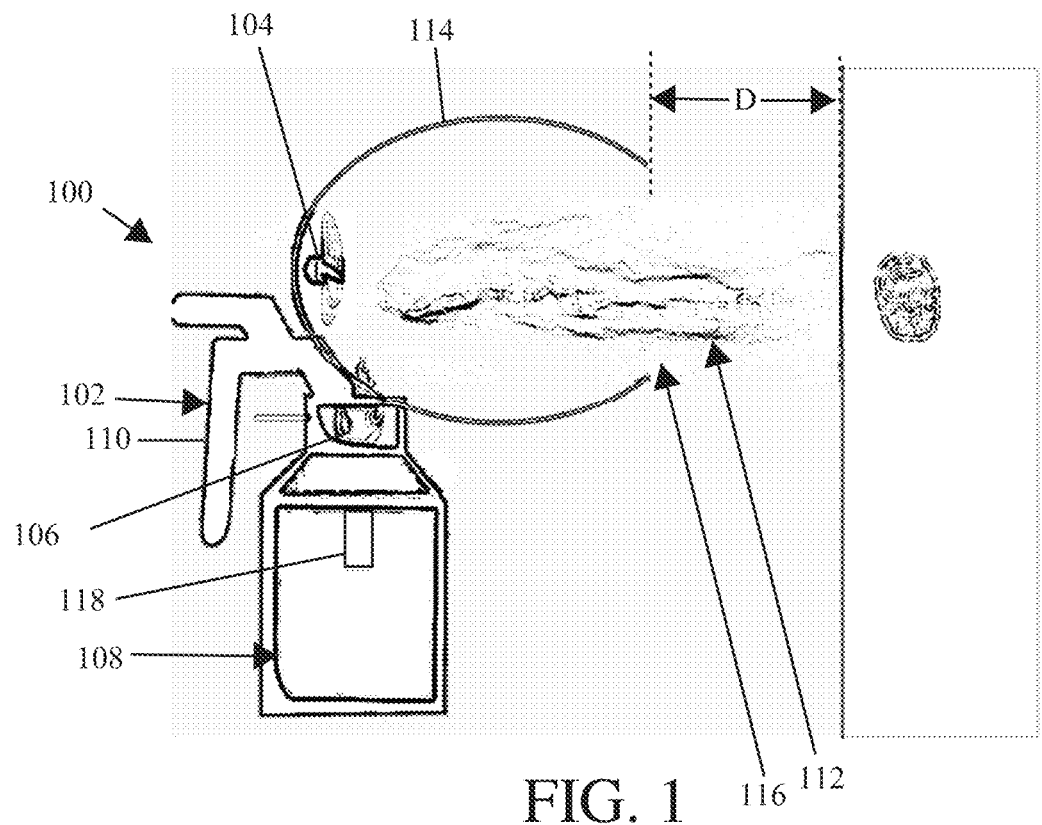
FIG. 1 is a schematic drawing of a fingerprinting system, further depicting produced soot being emitted onto a surface with a fingerprint, according to one embodiment of the present disclosure.
Figure 2:
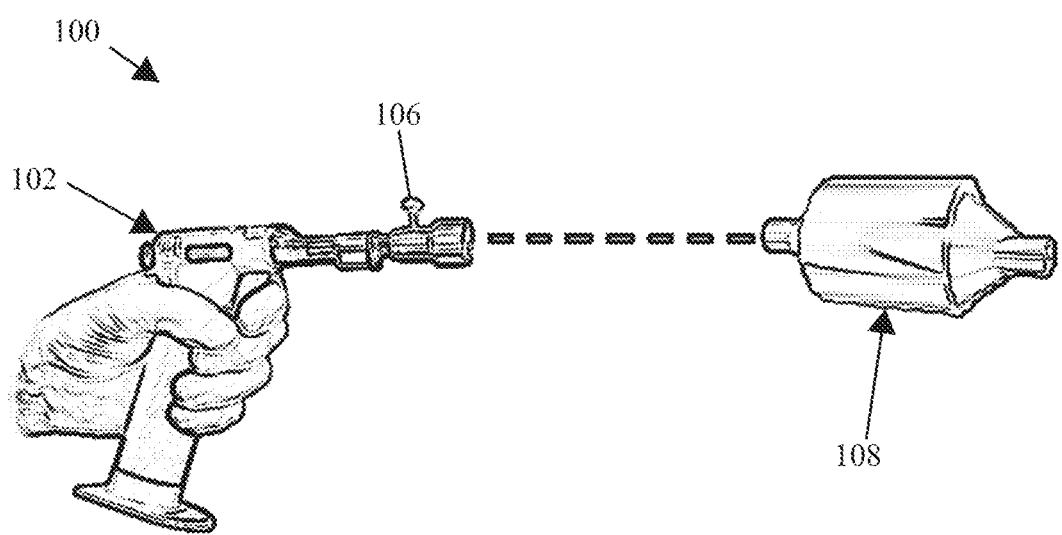
FIG. 2 is a front perspective view of a fingerprinting system provided with a hydrocarbon fuel source as a cartridge, further depicting the cartridge being accepted by an opening of the main body, according to one embodiment of the present disclosure.
Figure 3:
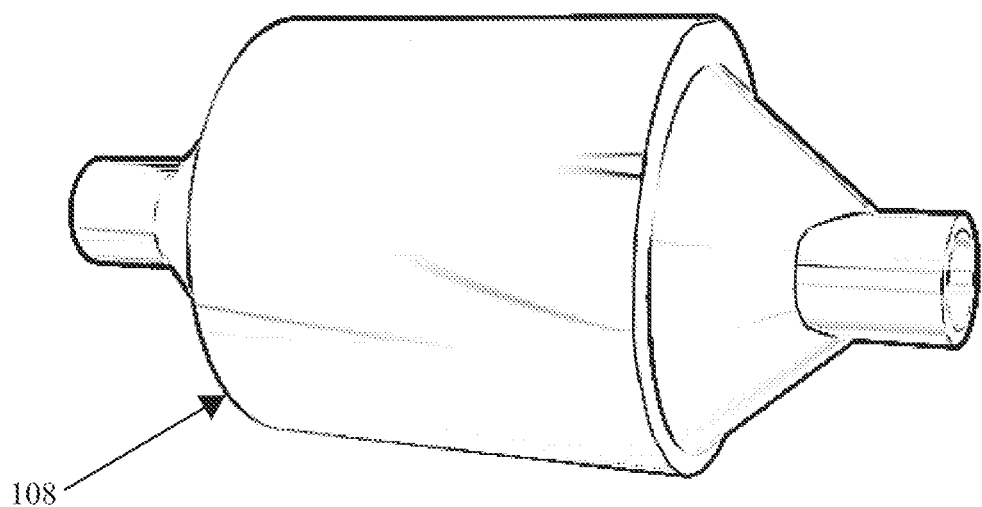
FIG. 3 is a front perspective view of the cartridge, as shown in FIG. 2, according to one embodiment of the present disclosure.
Figure 4:
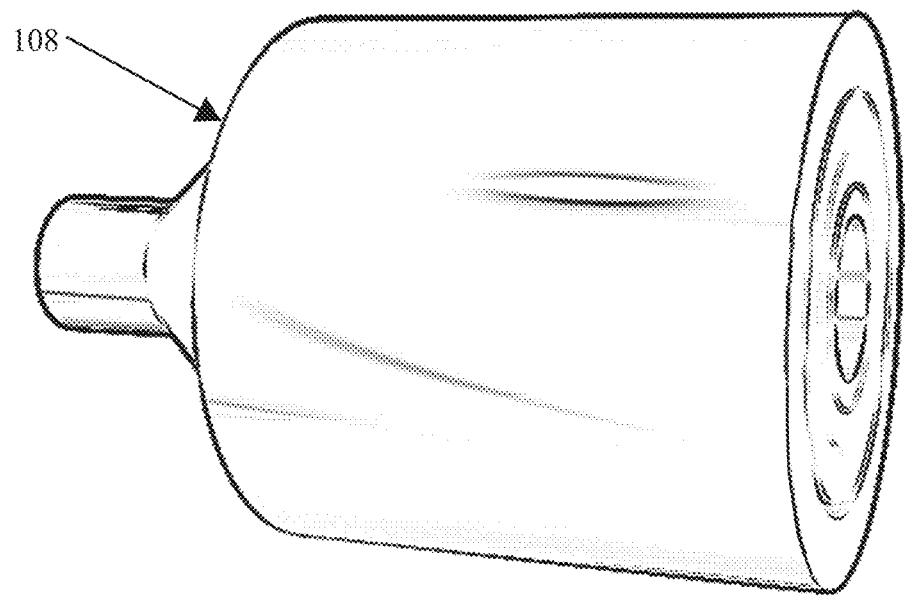
FIG. 4 is a front perspective view of the fingerprinting system, further depicting an interior of the cartridge, as shown in FIGS. 2-3, according to one embodiment of the present disclosure.
Figure 5:
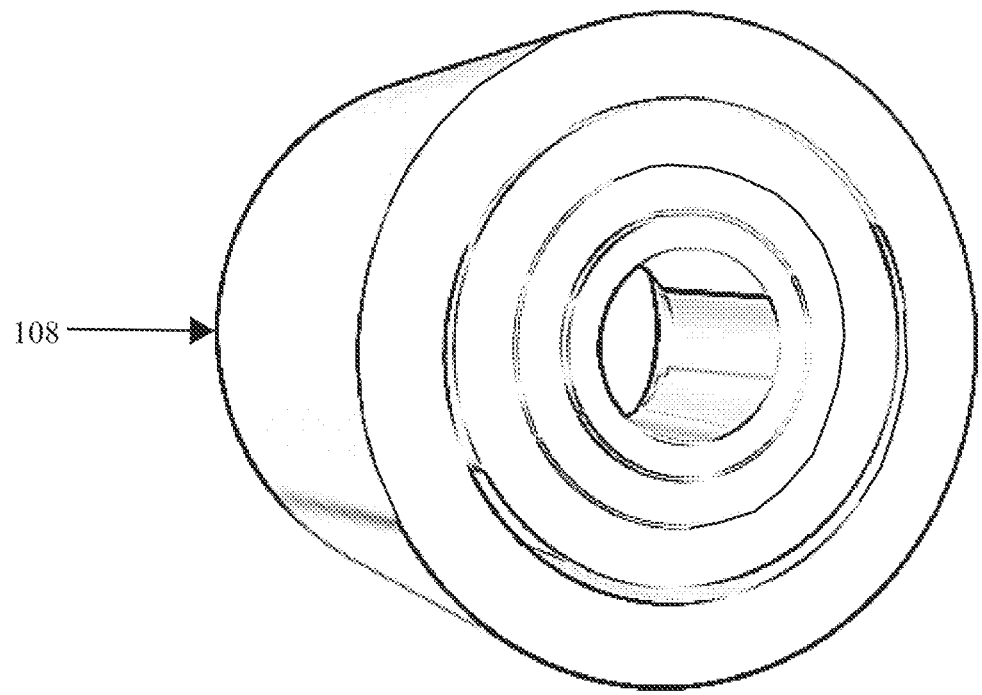
FIG. 5 is a right-side perspective view of the fingerprinting system, further depicting an interior of the fingerprinting system, as shown in FIGS. 2-4, according to one embodiment of the present disclosure.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIG. is turned over, elements described as "below", or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As shown in FIG. 1, the fingerprinting system 100 includes a main body 102, an air movement source 104, an ignitor 106, and a hydrocarbon fuel source 108. The main body 102 may include a handle 110. The air movement source 104 may include a fan. The air movement source 104 may be coupled to the main body 102. The ignitor 106 may be coupled to the main body 102. The hydrocarbon fuel source 108 may be selectively coupled to the main body 102 and disposed substantially adjacent to the ignitor 106. The hydrocarbon fuel source 108 may include a carbon to hydrogen ratio of $C_nH_{2n}$ to $C_nH_{2n+2}$. In a specific example, the hydrocarbon fuel source 108 may include polyaromatic hydrocarbons, strait chains, and/or branched hydrocarbons. The hydrocarbon fuel source 108 may include liquid fuels such as butane and/or motor oil, provided as non-limiting examples. In a more specific example, the liquid fuel may include used motor oil, which may advantageously permit an economical fuel source and an alternative environmental use for a conventional waste product. The hydrocarbon fuel source 108 may also include solid fuels such as paraffin and/or wood, provided as non-limiting examples. The hydrocarbon fuel source 108 may include gaseous fuels such as methane, ethane, and/or butane, provided as non-limiting examples. The hydrocarbon fuel source 108 may be coupled to the main body 102. The ignitor 106 may be configured to burn the fuel of the hydrocarbon fuel source 108 and/or initiate the combustion of the fuel of the hydrocarbon fuel source 108. The fingerprinting system 100 may be configured to produce soot 112 from the burning of the hydrocarbon fuel source 108, and to direct the soot 112, via the air movement source 104, toward a surface to be analyzed for fingerprints.

With continued reference to FIG. 1, the hydrocarbon fuel source 108 may provide various benefits. For instance, as the fuel of the hydrocarbon fuel source 108 burns into soot 112, the soot 112 may contain carbon, carbon dioxide, and water. The produced carbon may condense into a hexagonal graphite structure. In a specific example, the produced soot 112 may be carbon black. In an even more specific example, the produced soot 112 may be channel black. It is known that the size of the hexagonal graphite structure may be as low as 6.71 angstroms. However, the hexagonal graphite structure may agglomerate into much larger particles. Due to certain factors such as gravity and wind resistance, the larger particles of the hexagonal graphite structure may not travel as far as smaller particles when pushed by the air movement source 104. Therefore, the size of the particles being applied to a surface may be controlled by adjusting a distance D between the fingerprinting system 100 and the surface to be analyzed for fingerprints. For instance, the fingerprinting system 100 may be utilized at a distance D that militates against larger particles of the hexagonal graphite structure from disposing on the surface to be analyzed for fingerprints, but the distance D may still permit for the smaller particles of the hexagonal graphite structure to be disposed on the surface to be analyzed for fingerprints. Advantageously, the smaller particles of the hexagonal graphite structure may produce an enhanced fingerprint with more detail and greater definition. The particles of the hexagonal graphite structure may adhere via adsorption to a residue of moisture and oil creating the fingerprint. It should be understood that adsorption describes a process that occurs when a gas or liquid solute accumulates on a surface of a solid or a liquid (absorbent) forming a molecular or atomic film (adsorbate). In a specific example, the soot 112 produced from the fingerprinting system 100 and emitted on a surface may have a hexagonal graphite structure smaller than around twenty angstroms. In a more specific example, the soot 112 produced from the fingerprinting system 100 and emitted on the surface may have a hexagonal graphite structure smaller than around ten angstroms. In an even more specific example, the soot 112 produced from the fingerprinting system 100 and emitted on the surface may have a hexagonal graphite structure smaller than around eight angstroms. Desirably, by controlling the particle size of the hexagonal graphite structure in conjunction with utilizing adsorption, enhanced resolution of the fingerprints may be produced, and less carbon dust may be needed. By creating the carbon dust on site, the logistics of transporting small particle carbon dust is militated against and/or eliminated, thus further militating against explosion risks, cross-contamination concerns, and the greater risk of agglomeration of particles that is present if the small particle carbon dust is provided in a storage container.

In a particular embodiment, the fuel of the hydrocarbon fuel source 108 may also include a 2-ethylcyanoacrylate resin. The 2-ethylcyanoacrylate resin may be burned simultaneously with the carbon element of the fuel of the hydrocarbon fuel source 108. Advantageously, the 2-ethylcyanoacrylate resin may enhance the securement of the carbon dust to the fingerprint being analyzed and/or the surface being analyzed.

With reference to FIG. 1, the main body 102 may have certain functionalities that may be performed by various components. For example, the main body 102 may include a shroud 114 having an opening 116 that is configured to direct the produced soot 112 from the burned hydrocarbon source. In a specific example, the shroud 114 may be adjustable to alter the amount of soot 112 emitted, the direction of the soot 112 emitted, and/or the emittance pattern of the soot 112 produced from the fingerprinting system 100. More specifically, the opening 116 of the shroud 114 may be adjusted to be a narrower opening, a wider opening, an angled opening, and/or a directional opening. In another specific example, the handle 110 may be disposed substantially opposite from the opening 116 of the shroud 114. Advantageously, the air movement source 104 and/or the shroud 114 may be configured to direct the produced soot 112 away from a user, thereby militating against health concerns to the user, such as lung irritation from inhaling the small particle carbon dust. It should be appreciated that since small particles are still being displaced into the environment of use, vapor masks and eye protection are still recommended. In a specific example, the shroud 114 may be disposed substantially above the hydrocarbon fuel source 108. The shroud 114 may have a funnel-shaped opening 116 configured to funnel the produced soot 112 into a more directed stream of soot 112. Alternatively, the shroud 114 may include a horn-shaped opening 116 that is configured to distribute the produced soot 112 more broadly on a surface to be analyzed for fingerprints. One skilled in the art may use other configurations of the main body 102 to direct the produced soot 112 from the fingerprinting system 100, within the scope of the present disclosure.

Figure 6:
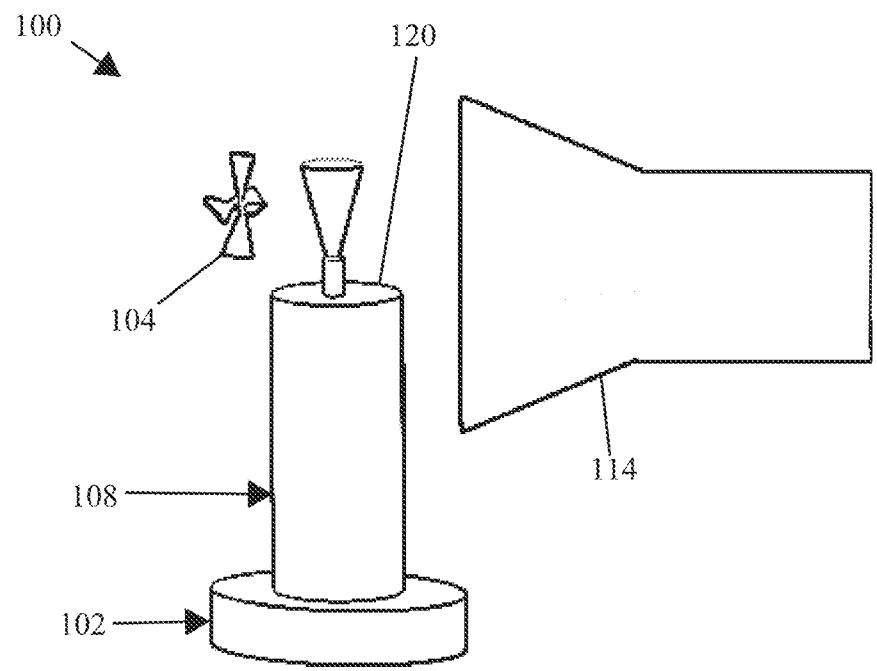
FIG. 6 is a front perspective view of the fingerprinting system where the hydrocarbon fuel source is provided with a solid fuel, further depicting the air movement source directing the burned fuel toward a shroud, according to one embodiment of the present disclosure.

The hydrocarbon fuel source 108 may be provided in various ways. Where the hydrocarbon fuel source 108 is provided with a liquid fuel, as shown in FIG. 1, the main body 102 may include a wick 118 coupling the main body 102 to the hydrocarbon fuel source 108. Where the hydrocarbon fuel source 108 is provided with a solid fuel, as shown in FIG. 6, the main body 102 may include a height adjustable platform 120 to dispose the hydrocarbon fuel source 108 thereon. The height adjustable platform 120 may be configured to allow a contents of the solid hydrocarbon fuel source 108 to be positioned directly adjacent to the ignitor 106 and/or the air movement source 104. In a specific example, the adjustment means of the height adjustable platform 120 may include a push rod design, a threaded rod coupling, a friction fit design, and/or a protrusion/recess coupling. For instance, the threaded rod coupling may function by twisting a terminal end of the main body 102 retaining the hydrocarbon fuel source 108, which may then be configured to raise and/or lower the height adjustable platform 120, similar to a lip balm container. A skilled artisan may select other suitable methods of adjusting the hydrocarbon fuel source 108, within the scope of the present disclosure.

As shown in FIGS. 2-5, the hydrocarbon fuel source 108 may be provided as a cartridge and the main body 102 may at least partially accept the cartridge. In a specific example, the cartridge may provide a disposable and/or refillable fuel source for an ignitor device such as a fuming gun and/or a burling torch. For instance, the main body 102 may include a first terminal end that couples the cartridge to the ignitor device and a second terminal end that include a shroud 114. The ignitor 106, the main body 102, and the air movement source 104 may also be provided in the form of the ignitor device. In an alternative example, the ignitor 104 and/or the air movement source 104 may be provided on the cartridge attachment itself. For instance, the ignitor 104 may be provided within the main body 102. The air movement source 104 may be coupled to the shroud 114 of the main body 102 on the second terminal end. In certain circumstances, the cartridge may be selectively coupled to an outlet of the main body 102. For instance, where the main body 102, the ignitor 106, and the air movement source 104 are provided as a fuming gun and/or a burling torch having an outlet, the cartridge may be at least partially accepted by the outlet. One skilled in the art may select other suitable ways to provide the hydrocarbon fuel source 108 as a cartridge, within the scope of the present disclosure.

Figure 8:
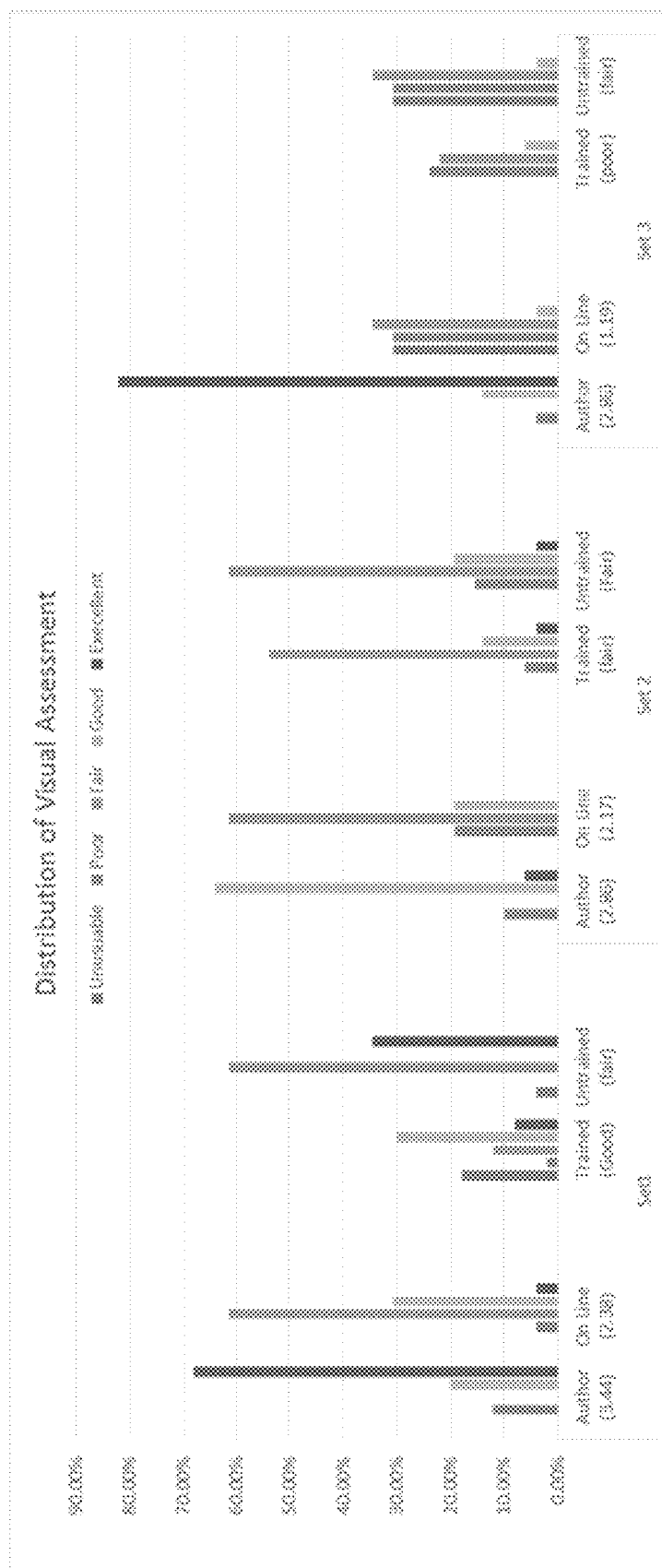
FIG. 8 is a bar chart illustrating the results of a visual assessment for the fingerprinting system.

Provided as non-limiting examples, FIGS. 7-8 illustrate various results of the fingerprinting system 100 described in the present disclosure in comparison to known methods. For instance, FIG. 7 depicts a comparison of the present disclosure with axis inversion red dying and known carbon black dusting. More specifically, FIG. 7 illustrates the colorimetric data of fingerprints made with three systems. Of particular significance is the ΔE column, where the higher value represents a more visible print. To note, values above 1-1.5 are needed for acceptable visibility. This comparison highlights the fingerprinting system 100 of the present disclosure advantageously provides a print with enhanced visibility. Further, FIG. 8 illustrates a comparison of three sets of samples that were chosen to represent the prints of all qualities. Set 1 represents prints made with carbon black, set 2 represents prints made with cyanoacrylate, and set three represents prints made with AXI red. These images were then reviewed by twenty-two volunteers evaluating the quality of the images. The volunteers crossed a spectrum of training and experience. Five volunteers were professional fingerprint examiners with at least 5 years of experience. Two volunteers were professionally familiar with fingerprint analysis but had no professional experience actually analyzing fingermarks. The remaining fifteen individuals had no prior training in fingerprint analysis. FIG. 8 illustrates a chart depicting the comparison of the quality of the prints as seen by the author and as seen by the volunteers. Separate charts are presented for the trained and untrained volunteers. As can be seen, the trained observers ranked the carbon black as having the overall best readability or at least comparable to the other methods. This is important because the other two methods are both fuming based systems while carbon black was always manually applied.

In certain circumstances, the fingerprinting system 100 may include a kit. The kit may include a main body 102, an air movement source 104, an ignitor 106, and a hydrocarbon fuel source 108. Each of the air movement source 104, the ignitor 106, and the hydrocarbon fuel source 108 may be configured to be individually coupled to the main body 102. The hydrocarbon fuel source 108 may be configured to be disposed substantially adjacent to the ignitor 106. In certain circumstances, the hydrocarbon fuel source 108 may be configured to be selectively coupled to the main body 102. Advantageously, where the hydrocarbon fuel source 108 is configured to be selectively coupled to the main body 102, the hydrocarbon fuel source 108 may be refilled and/or replaced, thereby permitting the fingerprinting system 100 to be utilized for multiple applications.

Various ways of using the fingerprinting system 100 are provided. For instance, as shown in FIG. 9, a method 200 may include a step 202 of providing the fingerprinting system 100 having a main body 102, an air-movement source 104, an ignitor 106, and a hydrocarbon source. The air-movement source 104 may be coupled to the main body 102. The ignitor 106 may be coupled to the main body 102. The hydrocarbon source may be coupled to the main body 102 and disposed substantially adjacent to the ignitor 106. The method may include a step 204 of providing a surface with a fingerprint. Next, the ignitor 106 of the fingerprinting system 100 may be engaged. The method may include a step 210 of burning the hydrocarbon fuel source 108 to produce particles of soot 112. Then, the air movement source 104 may be engaged. Afterwards, the produced soot 112 may be directed towards the surface with the fingerprint. In certain circumstances, a distance between the fingerprinting system 100 and the surface with the fingerprint may be adjusted so that larger particles of soot 112 are militated against from being disposed on the surface with the fingerprint. In a specific example, the method may also include a step 210? of adjusting an amount of the soot 112, a direction of the soot 112, and/or a pattern of the soot 112 emitted from the fingerprinting system 100 where the main body 102 includes an adjustable shroud 114. One skilled in the art may select other suitable ways of using the fingerprinting system 100 of the present disclosure, within the scope of the present disclosure.

Advantageously, the fingerprinting system 100 may quickly apply carbon particles to larger areas without increasing the risk of cross contaminating the stored carbon source. Desirably, the fingerprinting system 100 may also better preserve the condition of the fingerprint being analyzed by having a contactless application method.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods can be made within the scope of the present technology, with substantially similar results.

What is claimed is:

1. A fingerprinting system comprising:
   a main body,
      wherein the main body includes an outlet;
   an air movement source coupled to the main body;
   an ignitor coupled to the main body; and
   a hydrocarbon fuel source selectively coupled to the main body and disposed substantially adjacent to the ignitor,
      wherein the hydrocarbon fuel source includes a cartridge, and the main body at least partially accepts the cartridge, and the cartridge is partially accepted by the outlet.

2. The fingerprinting system of claim 1, wherein the air movement source is a fan.

3. The fingerprinting system of claim 1, wherein the hydrocarbon fuel source may have a fuel with a carbon to hydrogen ratio of CnH2n to CnH2n+2.

4. The fingerprinting system of claim 3, wherein the hydrocarbon source includes at least one of a polyaromatic hydrocarbon, a strait chain hydrocarbon, and a branched hydrocarbon.

5. The fingerprinting system of claim 4, wherein the hydrocarbon fuel source includes a liquid fuel.

6. The fingerprinting system of claim 5, wherein the hydrocarbon fuel source includes recycled motor oil.

7. The fingerprinting system of claim 3, wherein the hydrocarbon fuel source includes a gaseous fuel including at least one of methane, ethane, and butane.

8. The fingerprinting system of claim 4, wherein the fingerprinting system produces having a hexagonal graphite structure smaller than around twenty angstroms.

9. The fingerprinting system of claim 8, wherein the fingerprinting system produces soot having a hexagonal graphite structure smaller than around ten angstroms.

10. The fingerprinting system of claim 9, wherein the fingerprinting system produces soot having a hexagonal graphite structure smaller than around eight angstroms.

11. The fingerprinting system of claim 3, wherein the hydrocarbon fuel source further includes a 2-ethylcyanoacrylate resin.

12. The fingerprinting system of claim 1, wherein the main body includes a shroud having an opening configured to direct soot produced from a burned hydrocarbon source.

13. The fingerprinting system of claim 12, wherein the shroud is adjustable to alter at least one of an amount, a direction, and a pattern of the soot emitted from the fingerprinting system.

14. The fingerprinting system of claim 12, wherein the main body further includes a handle disposed substantially opposite from the opening of the shroud.

15. A kit for a fingerprinting system, the kit comprising:
   a main body,
      wherein the main body includes an outlet;
   an air-movement device configured to be coupled to the main body;
   an ignitor configured to be coupled to the main body; and
   a hydrocarbon fuel source configured to be coupled to the main body and disposed substantially adjacent to the ignitor,
      wherein the hydrocarbon fuel source includes a cartridge, and the main body at least partially accepts the cartridge, and the cartridge is partially accepted by the outlet.

16. A method of using a fingerprinting system configured to enhance the visualization of a fingerprint, the method comprising the steps of:
   providing a fingerprinting system having a main body, an air-movement device, an ignitor, and a hydrocarbon fuel source, the main body includes an outlet, the air-movement device is coupled to the main body, the ignitor is coupled to the main body, the hydrocarbon source is coupled to the main body and disposed substantially adjacent to the ignitor, the hydrocarbon fuel source includes a cartridge, and the main body at least partially accepts the cartridge, and the cartridge is partially accepted by the outlet;
   providing a surface with the fingerprint;
   engaging the ignitor of the fingerprinting system;
   burning the hydrocarbon source to produce soot;
   engaging the air-movement device of the fingerprinting system; and
   directing the produced soot toward the surface with the fingerprint.

17. The method of claim 16, further comprising a step of adjusting a particle size of the soot by altering a distance between the fingerprinting system and the surface with the fingerprint.

18. The method of claim 16, further comprising a step of adjusting at least one of an amount, a direction, and a pattern of the soot emitted from the fingerprinting system wherein the main body includes an adjustable shroud.

* * * * *